United States Patent
Hyser et al.

(10) Patent No.: US 9,342,375 B2
(45) Date of Patent: May 17, 2016

(54) MANAGING WORKLOAD AT A DATA CENTER

(75) Inventors: Chris D. Hyser, Victor, NY (US); Martin Arlitt, Calgary (CA); Tahir Cader, Liberty Lake, WA (US); Cullen E. Bash, Los Gatos, CA (US); Richard Shaw Kaufmann, San Diego, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 794 days.

(21) Appl. No.: 13/282,394

(22) Filed: Oct. 26, 2011

(65) Prior Publication Data

US 2013/0111494 A1 May 2, 2013

(51) Int. Cl.
*G06F 9/46* (2006.01)
*G06F 9/50* (2006.01)

(52) U.S. Cl.
CPC ...... *G06F 9/5094* (2013.01); *G05B 2219/2639* (2013.01); *Y02B 60/142* (2013.01); *Y02E 50/343* (2013.01)

(58) Field of Classification Search
None
See application file for complete search history.

(56) References Cited

U.S. PATENT DOCUMENTS

| | | | |
|---|---|---|---|
| 6,454,944 B1* | 9/2002 | Raven | 210/603 |
| 7,525,207 B2* | 4/2009 | Clidaras et al. | 290/43 |
| 7,778,940 B2* | 8/2010 | Mazzarella | 705/412 |
| 7,970,903 B2 | 6/2011 | Oeda | |
| 2004/0095237 A1* | 5/2004 | Chen et al. | 340/506 |
| 2008/0046387 A1* | 2/2008 | Gopal et al. | 705/412 |
| 2008/0278003 A1 | 11/2008 | Pouchet et al. | |
| 2009/0063228 A1 | 3/2009 | Forbes, Jr. | |
| 2009/0093916 A1* | 4/2009 | Parsonnet et al. | 700/286 |
| 2009/0235097 A1 | 9/2009 | Hamilton et al. | |
| 2009/0240381 A1 | 9/2009 | Lane | |
| 2010/0076607 A1 | 3/2010 | Ahmed et al. | |
| 2010/0087963 A1 | 4/2010 | Boston et al. | |
| 2010/0145542 A1 | 6/2010 | Chapel et al. | |
| 2010/0211443 A1* | 8/2010 | Carrel et al. | 705/14.11 |
| 2011/0011110 A1* | 1/2011 | Hanson et al. | 62/259.2 |
| 2011/0035073 A1 | 2/2011 | Ozog | |
| 2011/0146315 A1* | 6/2011 | Zakrzewski | 62/238.3 |
| 2011/0154353 A1* | 6/2011 | Theroux et al. | 718/104 |
| 2011/0173465 A1 | 7/2011 | Akers et al. | |
| 2011/0278928 A1* | 11/2011 | Burger et al. | 307/39 |

OTHER PUBLICATIONS

Crosman, P.; Wind, Solar Energy Being Tested on Data Center Pods; Aug. 1, 2011; http://www.americanbanker.com/issues/176_148/wind-solar-energy-tested-on-data-center-pods-1040766.1.html.

* cited by examiner

*Primary Examiner* — Sean Shechtman

(74) *Attorney, Agent, or Firm* — Trenner Law Firm, LLC

(57) ABSTRACT

Systems and methods of managing workload at a data center are disclosed. An example method may include actively managing workload at a data center to realize energy savings. The method may also include providing excess power generated for the data center onto a utility grid.

17 Claims, 6 Drawing Sheets

MANAGING WORKLOAD AT A DATA CENTER

BACKGROUND

It is often difficult for utilities to operate power production plants for peak power usage, when the average (also called "base") load may run below peak power usage. The utility often relies on predictions of base load and peak power usage, but these predictions can be inaccurate and difficult to assess in the long term. When the utility is unable to keep up with peak power consumption, the result can be rolling blackouts or brownouts.

Bringing new base-load power generation plants online is subject to long lead times. The utility may install natural gas power production plants to accommodate peak usage until new power production plants can be brought online. But power production using natural gas is expensive, and these expenses are typically passed along to utility customers.

Data centers need a reliable, cost-effective source of electricity in order to avoid downtime. Some data centers are connected to diesel power generators to provide a backup power supply for the data center during electricity brownouts and blackouts. These generators can be inefficient and expensive to operate. In addition, these generators may be regulated for emissions and noise.

DETAILED DESCRIPTION

Figure 1:
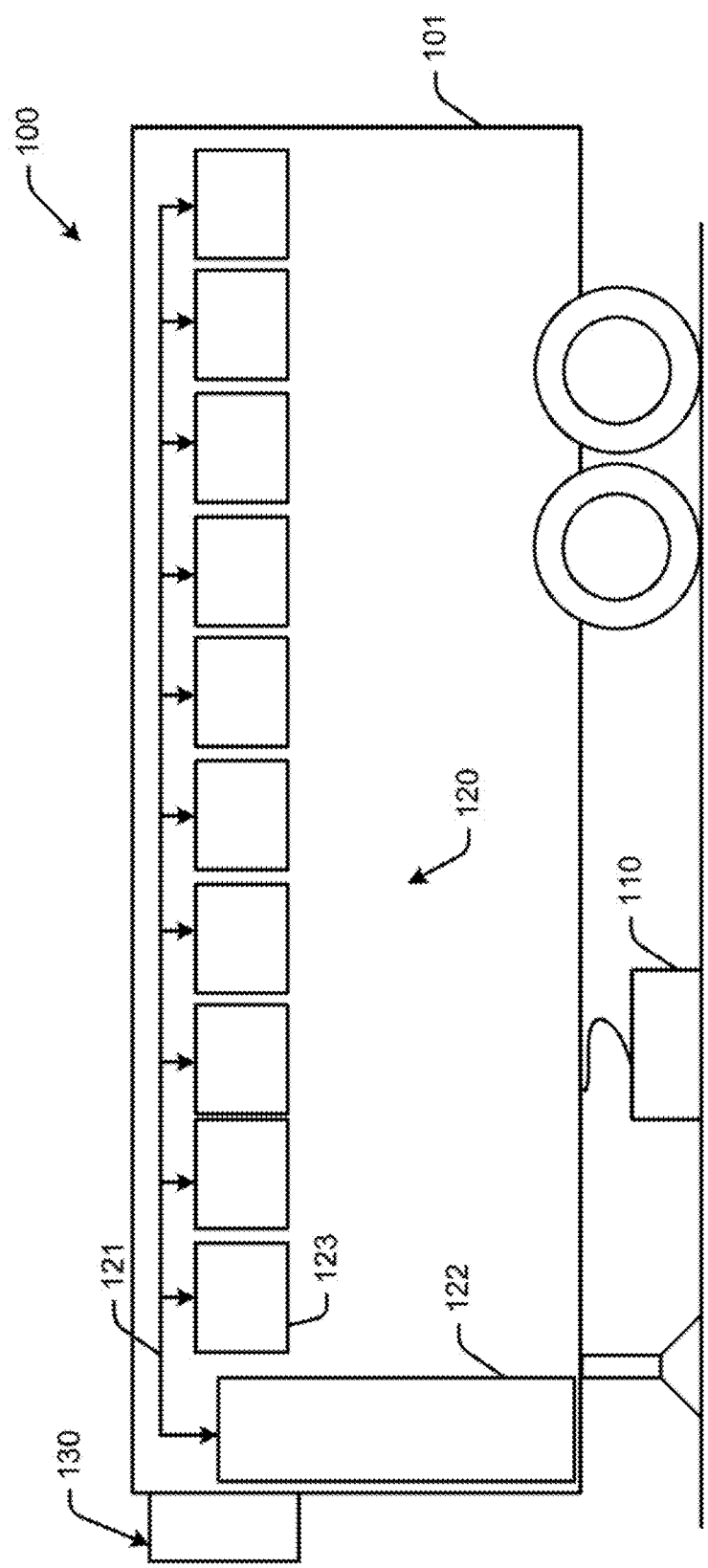
FIG. 1 is a high-level illustration of an example data center that may implement workload management.

Data centers may be partially or even fully self-sufficient. Self-sufficient data centers provide at least some of their own electrical power generation. For example, data centers may be provided with a power generator. While in the past diesel power generators have been standard, renewable energy sources are becoming more cost effective and efficient at generating electricity.

An example of a self-sufficient data center is a containerized data center that can be co-located with "off-grid" sources for power generation. Power generation may include traditional sources, in addition to alternative energy sources, such as but not limited to, biogas-fueled power generators, solar panels, and wind energy. These data centers may further implement workload management techniques described herein, including modified scheduling of batch jobs, modification of provided quality of service (QoS), and spot pricing for services to reduce workload under certain circumstances. For example, it may be desirable to decrease workload and realize power savings at the data center when it may be profitable to sell power generated at the data center, onto the electrical grid.

The systems and methods described herein may be implemented to remove sufficient workload from the data center, such that computing resources and/or cooling resources can be taken offline to reduce power consumption at the data center. In an example, the data center operator may implement spot pricing to achieve a reduction in workload at the data center. The data center operator may also offer incentives to customers to shed workload so that resources can be taken offline to realize a power savings.

In another example, the data center operator may reduce quality of service (QoS). A "green class" of service may even be offered to data center customers. These customers may sign up for the "green class" of service based on financial incentives (e.g., lower cost), for social reasons, and/or for publicity.

The power savings realized by managing workload at the data center can then be passed along to the utility in the form of a supplemental energy source. Not only does this increase profits for the data center, but reducing load and providing excess electricity onto the power grid aids the utility in providing sufficient capacity to other users.

In example use cases, the systems and methods described herein may be utilized to reduce the number of brownout or blackout events, and/or lessen the effect of a brownout or blackout event when these do occur.

By way of illustration, the power generated at the data center may be sold to the utility grid at any time the current grid price is higher than its estimated self-generated energy costs. One may expect to make more money by selling compute resources to data center customers. But during times of peak usage, if the utility grid is offering a price higher than what makes sense for operating the compute resources, the data center may shed workload and sell the power instead. Additionally, the data center may be willing to sell power during peak usage, even if the data center could have made more money selling compute resources, because of other non-price incentives from the grid utility, or perhaps even as part of corporate policy.

In an example, the data center is generating "A" amount of power at cost "c1." At some moment in time, the data center is using "B" amount of power for compute resources, and making profit "p1," and the utility is offering to pay "p2" for excess electricity. So anytime $p2>c1$ and $B<A$, the data center may sell electricity to the utility (A−B power) whether or not the utility has a "peak issue" (e.g., brownout or black out event). If during a peak event, the grid profit becomes p3, $p3>p2$, $p3>c1$, $p3>p1$, the data center actively tries to reduce load, because it only makes p1 money instead of p3 profit.

Before continuing, it is noted that the term "spot pricing" is used herein to mean the application of a "spot price" or "spot rate." The spot price (or rate) is commonly used in economics to price commodities, securities, or currencies, and is quoted for immediate (i.e., on the "spot") payment and delivery. As used herein, the term "spot pricing" indicates expectations of a future price movement, such as the expectation that operating costs for a data center will increase (or decrease) based on expected workload, the current configuration, and any equipment that may need to be powered on (or off) based on future workload.

It is noted that as used herein, the terms "includes" and "including" mean, but is not limited to, "includes" or "including" and "includes at least" or "including at least." The term "based on" means "based on" and "based at least in part on."

FIG. 1 is a high-level illustration of an example data center 100 that may implement workload management. Modern data centers offer a consolidated environment for providing, maintaining, and upgrading hardware and software for an enterprise, in addition to more convenient remote access and collaboration by many users. Modern data centers also provide more efficient delivery of computing services. For example, it is common for the processor and data storage for a typical desktop computer to sit idle over 90% of the time during use. This is because the most commonly used applications (e.g., word processing, spreadsheets, and Internet browsers) do not require many resources. By consolidating processing and data storage in a data center, the same processor can be used to provide services to multiple users at the same time.

Data centers can include many different types of computing resources, including processing capability, storage capacity, and communications networks, just to name a few examples of equipment and infrastructure. The number and type of computing resources provided by a data center may depend at least to some extent on the type of customer, number of customers being served, and the customer requirements. Data centers may be any size. For example, data centers may serve an enterprise, the users of multiple organizations, multiple individual entities, or a combination thereof.

The example data center 100 shown in FIG. 1 is a "containerized" data center embodied in a semi-truck trailer 101. A containerized data center is an example of a smaller data center used by a single customer (albeit having multiple users), or by a limited number of customers. The containerized data center is a more recent development in data centers, allowing computing resources to be provided on an ad-hoc basis. An example containerized data center includes all of the equipment mounted in a semi-truck trailer.

Containerized data centers, such as the example data center shown in FIG. 1, may be used by enterprises having to deploy and move data services to field locations that change over time. For example, oil and gas exploration entities may benefit from the use of containerized data centers. Often, the areas in which these entities are operating are many, and change over time. So it may not be feasible to build dedicated facilities for hosting data services for these entities. In addition, there may be restrictions which prevent the construction of dedicated data centers at some field locations. Other users may also utilize containerized data centers.

The systems and methods described herein are well-suited for use with containerized data centers, which use electricity provided by an on-site power generator 110. Power generator 110 may be any type(s) of electricity generating source, including but not limited to, conventional gas or diesel generators, biogas-fueled generators, solar, and/or wind power sources. It is noted, however, that the systems and methods are not limited in use, and may in fact be used with any data center and any means of power production.

Regardless of the physical configuration and location of the data center 100, communications in data centers are typically network-based. The most common communications protocol is the Internet protocol (IP), however, other network communications may also be used. Network communications may be used to make connections with internal and/or external networks. Accordingly, the data center 100 may be connected by routers and switches and/or other network equipment 121 that move network traffic between the servers and/or other computing equipment 122, data storage equipment 123, and/or other electronic devices and equipment in the data center 100 (referred to herein generally as "computing infrastructure" 120).

Operating the infrastructure results in heat generation. Accordingly, the data center 100 may also include various environmental controls, such as equipment used for cooling operations in the data center. The cooling equipment is referred to herein generally as the "cooling infrastructure" 130. The cooling infrastructure may include relatively inexpensive cooling resources, such as air movers (e.g., fans and blowers) that utilize outside or ambient air for cooling operations. Cooling resources may also include more expensive refrigeration, air conditioning, and evaporative cooling, to name only a few examples of more resource-intensive cooling techniques. The type and configuration of cooling infrastructure may depend to some extent on the type and configuration of the computing infrastructure. The cooling infrastructure may also depend to some extent on the computing infrastructure that is "online" or operating, the use of computing infrastructure (e.g., periods of high use and/or low use), and external conditions (e.g., the outside temperature). In an example, the cooling infrastructure may be configured and/or reconfigured to provide a reduction in power consumption at the data center.

It is noted that the data center 100 is not limited to use with any particular type, number, or configuration of support infrastructure. The data center 100 shown in FIG. 1 is provided as an illustration of an example operational environment, but is not intended to be limiting in any manner.

The main purpose of the data center 100 is providing customers (e.g., service providers), and in turn the end-users with access to computing resources, including but not limited to data processing resources, data storage, and/or application handling. A customer may include anybody (or any entity) who desires access to resource(s) in the data center 100. The customer may also include anybody who desires access to a service provided via the data center 100. Of course, the data center operator can restrict access to the data center. Providing the client access to the resources in the data center 100 may also include provisioning of the resources, e.g., via file servers, application servers, and the associated middleware.

During use, customers and end-users (referred to generally herein as "users") may desire access to the data center 100 for a particular purpose. Example purposes include executing software and providing services that were previously the exclusive domain of desktop computing systems, such as application engines (e.g., word processing and graphics applications), and hosted business services (e.g., package delivery and tracking, online payment systems, and online retailers), which can now be provided on a broader basis as hosted services via data center(s).

Use of the data center 100 by customers may be long term, such as installing and executing a database application, or backing up data for an enterprise. The purpose may also be short term, such as a large-scale computation for a one-time data analysis project. Regardless of the purpose, the customers may specify a condition for carrying out the purpose.

The condition may specify a single parameter, or multiple parameters for using resources in the data center 100. Based on these conditions, the data center 100 can be configured and/or reconfigured as part of an ongoing basis to provide the desired computing resources and an associated Quality of Service (QoS) for the user. For example, the condition for utilizing resources in the data center 100 may describe the storage requirements to install and execute a database application. In another example, the condition may specify more than one parameter that is to be provided as part of a service (e.g., both storage and processing resources).

The data center 100 is typically managed by an operator. An operator may include anybody (or any entity) who desires to manage the data center 100. For purposes of illustration, an operator may be a network administrator. The network administrator in charge of managing resources for the data center 100, for example, to identify suitable resources in the data center 100 for deploying a service on behalf of a customer. In another example, the operator may be an engineer in charge of managing the data center 100 for an enterprise. The engineer may deploy and manage processing and data storage resources in the data center 100. The engineer may also be in charge of accessing reserved resources in the data center 100 on an as-needed basis. The function of the operator may be partially or fully automated, and is not limited to network administrators or engineers.

The systems and methods described herein may implement data center management techniques to provide a "peak-shaving" capability, allowing the data center owner to sign contracts with utilities specifying excess power that can be provided to the utility in times of need. These contracts can allow the utility to operate closer to their base load without needing to build, operate, and maintain additional peak-only power plants.

Figure 2:
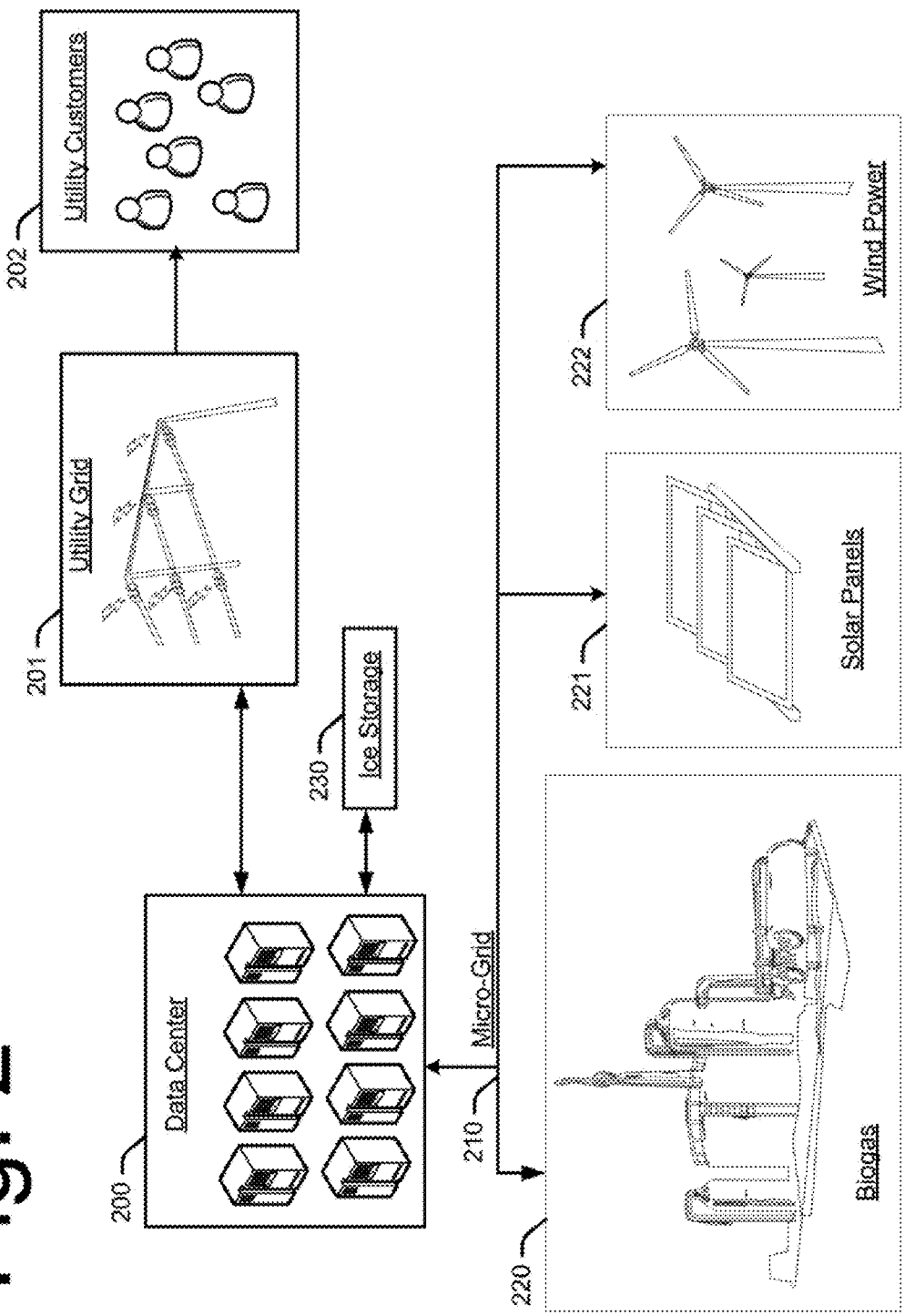
FIG. 2 is a high level illustration of data center 200 that may implement workload management to facilitate a partnership with a utility 201.

FIG. 2 is a high level illustration of data center 200 that may implement workload management to facilitate a partnership with a utility 201. The data center 200 may include an energy micro-grid 210 connecting any number of different power generators. In the example shown in FIG. 2, micro-grid 210 may include biogas production 220, solar panels 221, and wind power 222. However, the micro-grid 210 is not limited to use with these sources of power generation. Other examples may include traditional gas or diesel generators, and/or other power generators now known or later developed.

The data center 200 may achieve power savings using any of a number of different techniques. For example, the data center may adjust quality of service (QoS) for customers to reduce power consumption at the data center, permitting additional electricity to be provided to the utility.

The data center may even promote a "green" class of service for customers who are willing to accept a lower QoS during brownout events so that more energy is available to assist the utility. The customers may receive an incentive for doing this, e.g., a discount in price, or other incentive.

The data center may also adjust spot pricing for services using the data center, and/or offer incentives to reduce use (or promote use of the data center during off-peak times). Approaches for managing the data center to achieve these power savings are discussed in more detail below with reference to FIGS. 3-5.

With reference still to FIG. 2, power savings can also be achieved by managing the energy micro-grid 210 and the power generating sources. In an example, where a biogas digester 220 is used as a power generation source, biogas (e.g., methane) may be stored during times of off-peak workload. The excess biogas may be used to assist data center 200 and/or the utility 201 (and its customers 202) on an as-needed basis. For example, the biogas digester 220 may be used to power the data center 200 during peak use to help reduce the occurrence of brownouts (or even to generate additional revenue during peak times).

The storage could be on-site, or the biogas could be upgraded and added to a natural gas pipeline. If the site is connected to a natural gas pipeline, then it could also use that as a fuel source for its generators during the brownout conditions, and thus be a more reliable "peaker" application.

It is noted that some biogas digesters 220 have supplemental storage (e.g., a flexible roof that expands) to store biogas for "peaker" applications. A separate generator for "peak" production may not be needed if the primary generator can vary output on an as-needed basis.

In another example, multiple digesters 220 may be used to convert waste to biogas (e.g., methane). All of the digesters may be operated in the same manner, using similar feedstock/substrate mixes, similar storage mechanisms, etc. Alternatively, a subset of the digesters 220 may be managed/configured differently. For example, N−1 of the digesters 220 may be optimized for data center operations, while the Nth digester may have additional biogas storage capacity, and thus use a feedstock/substrate mix that has a faster rate of biogas production.

Food waste digests faster than animal waste and mixed waste. Therefore, the alternate feedstock/substrate mix replenishes the biogas storage more quickly than if the food waste (which is less plentiful) were spread across each of the plurality of digesters. Thus, the Nth digester is able to produce biogas faster than the other digesters 220.

Replenishing the stored biogas faster in this manner enables auxiliary biogas generation, which can be made available faster. That is, the digester 220 having excess biogas storage capacity can be used to fuel additional power generation capacity during brownout conditions on the utility grid. Alternatively, the output of this digester 220 can be used to power more energy-intensive chillers at the data center 200 during periods of high temperatures to reduce strain on the utility, and thus reduce the likelihood of a brownout.

In another example, ice storage may be incorporated into the data center design. During periods of lower electricity use at the data center, the local generators may be used to generate and store ice (using both electricity and waste heat). If utility prices for electricity are lower during the grid's off-peak times, then grid power from the utility may also be used to generate and store ice at the data center. During brownout events, the data center may tap the ice storage for cooling purposes, instead of having to power cooling infrastructure for the data center. Accordingly, the data center reduces strain on the utility during peak usage and/or locally generated power from the micro-grid 210 can be supplied to the utility 201.

These and other examples are contemplated for realizing energy savings at the data center 200, and for providing excess power onto the utility grid 201. Further operations for managing the data center 200 itself to achieve energy savings will now be explained with reference to FIG. 3.

Figure 3:
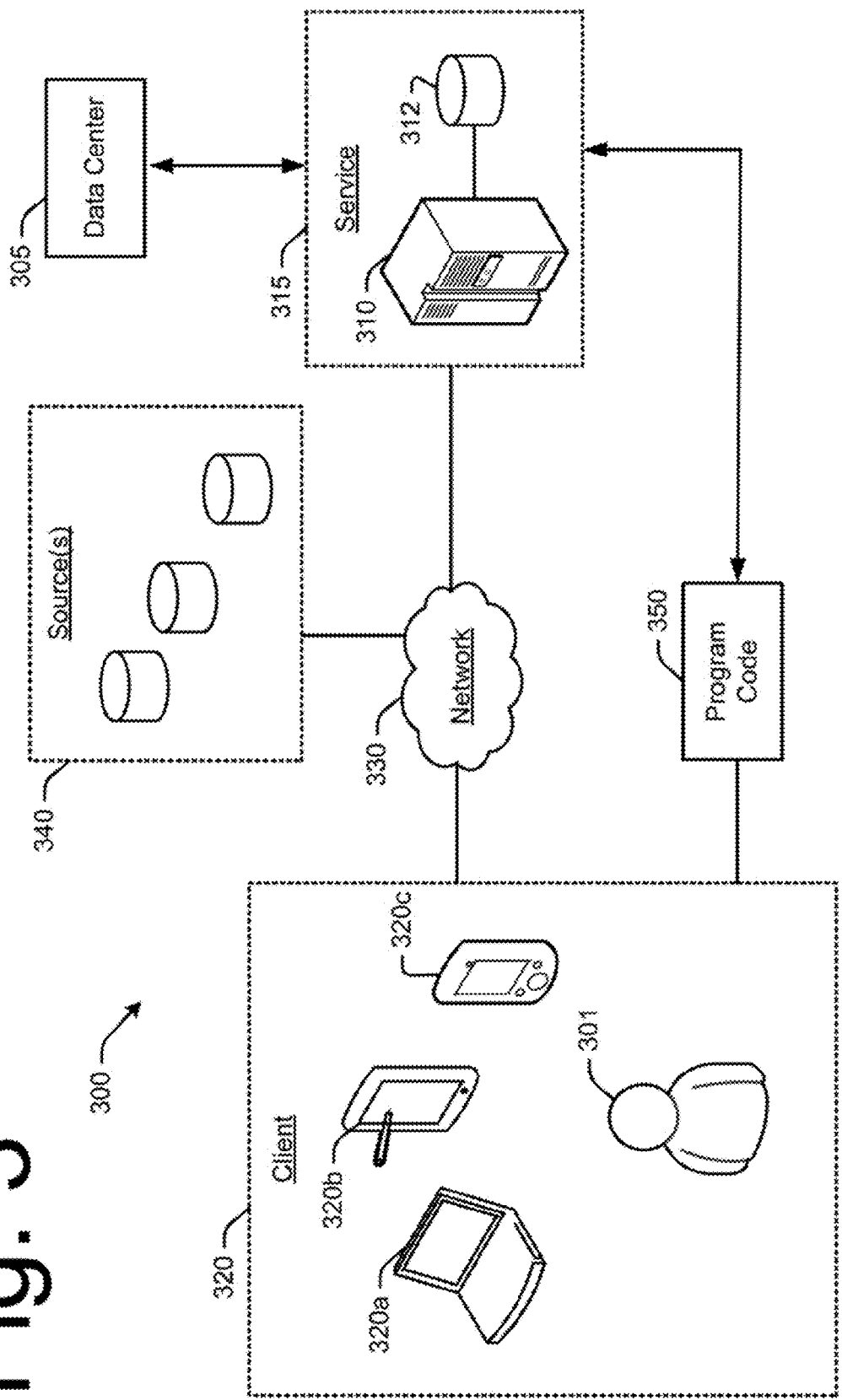
FIG. 3 is a high-level illustration of an example networked computer system that may be utilized to manage workload at a data center.

FIG. 3 is a high-level illustration of an example networked computer system 300 that may be utilized by an operator for managing workload in a data center 305 (e.g., the data center shown in FIGS. 1 and 2). System 300 may be implemented with any of a wide variety of computing devices for monitoring equipment use, and responding to power events by reducing workload in the data center 305.

Example computing devices include but are not limited to, stand-alone desktop/laptop/netbook computers, workstations, server computers, blade servers, mobile devices, and appliances (e.g., devices dedicated to providing a service), to name only a few examples. Each of the computing devices may include memory, storage, and a degree of data processing capability at least sufficient to manage a communications connection either directly with one another or indirectly (e.g., via a network). At least one of the computing devices is also configured with sufficient processing capability to execute the program code described herein.

In an example, the system 300 may include a host 310 providing a service 315 accessed by an operator 301 via a client device 320. For purposes of illustration, the service 315 may be implemented as a data processing service executing on a host 310 configured as a server computer with computer-readable storage 312. The service 315 may include interfaces to application programming interfaces (APIs) and related support infrastructure. The service 315 may be accessed by the operator to manage workload at the data center 305. The operator 301 may access the service 315 via a client 320. The client 320 may be any suitable computer or computing device 320a-c capable of accessing the host 310.

Host 310 and client 320 are not limited to any particular type of devices. Although, it is noted that the operations described herein may be executed by program code residing entirely on the client (e.g., personal computer 320a), in other examples (e.g., where the client is a tablet 320b or other mobile device 320c) the operations may be better performed on a separate computer system having more processing capability, such as a server computer or plurality of server computers (e.g., the host 310) and only accessed by the client 320.

In this regard, the system 300 may include a communication network 330, such as a local area network (LAN) and/or wide area network (WAN). The host 310 and client 320 may be provided on the network 330 via a communication protocol. Such a configuration enables the client 320 to access host 310 directly via the network 330, or via an agent, such as another network (e.g., in remotely controlled applications). In an example, the network 330 includes the Internet or other communications network (e.g., a 3G or 4G mobile device network). Network 330 may also provide greater accessibility to the service 315 for use in distributed environments, for example, where more than one operator may have input and/or receive output from the service 315.

The service 315 may be implemented in part via program code 350. In an example, the program code 350 is executed on the host 310 for access by the client 320. For example, the program code may be executed on at least one computing device local to the client 320, but the operator is able to interact with the service 315 to send/receive input/output (I/O) in order to manage workload in the data center 305.

Before continuing, it is noted that the computing devices described above are not limited in function. The computing devices may also provide other services in the system 300. For example, host 310 may also provide transaction processing services and email services and alerts or other notifications for the operator via the client 320.

During operation, the service 315 may be provided with access to local and/or remote source(s) 340 of information. The information may include information for the data center 305, equipment configuration(s), power requirements, and cooling options. Information may also include current workload and opportunities to realize power savings by managing the workload. The information may originate in any manner, including but not limited to, historic data and real-time monitoring.

The source 340 may be part of the service 315, and/or the source may be physically distributed in the network and operatively associated with the service 315. In any implementation, the source 315 may include databases for providing the information, applications for analyzing data and generating the information, and storage resources for maintaining the information. There is no limit to the type or amount of information that may be provided by the source. In addition, the information provided by the source 340 may include unprocessed or "raw" data, or data may undergo at least some level of processing before being provided to the service 315 as the information.

As mentioned above, operations for managing workload in the data center may be embodied at least in part in executable program code 350. The program code 350 used to implement features of the systems and methods described herein can be better understood with reference to FIG. 4 and the following discussion of various example functions. However, the operations are not limited to any specific implementation with any particular type of program code.

Figure 4:
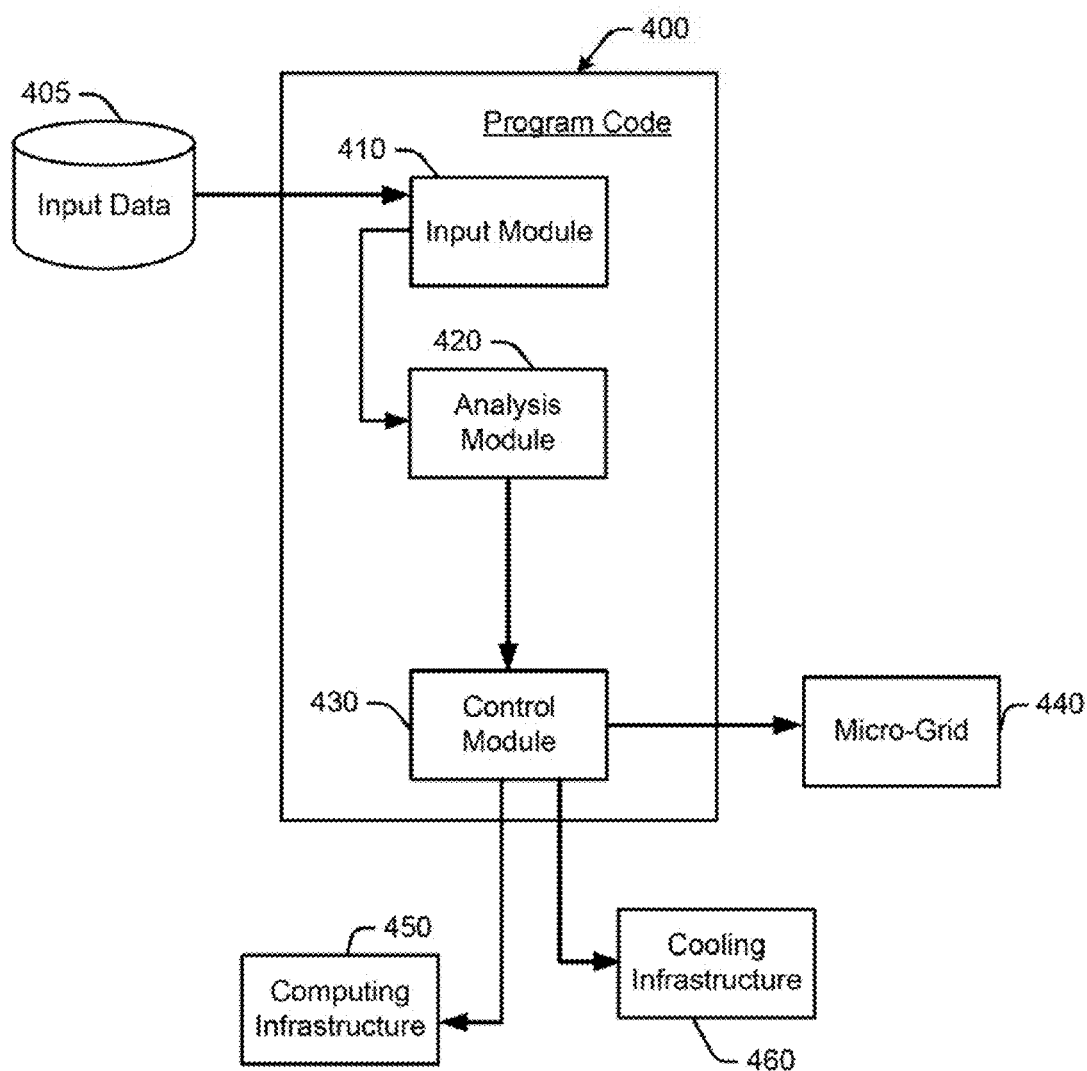
FIG. 4 shows an example architecture of machine readable instructions, which may be executed to manage workload at a data center.

FIG. 4 shows an example architecture 400 of machine readable instructions, which may be executed for managing workload at a data center. The program code discussed above with reference to FIG. 3 may be implemented in machine-readable instructions (such as but not limited to, software or firmware). The machine-readable instructions may be stored on a non-transient computer readable medium and are executable by one or more processor to perform the operations described herein. It is noted, however, that the components shown in FIG. 4 are provided only for purposes of illustration of an example operating environment, and are not intended to limit implementation to any particular system.

The program code may execute the function of the architecture of machine readable instructions as self-contained modules. These modules can be integrated within a self-standing tool, or may be implemented as agents that run on top of an existing program code. In an example, the architecture of machine readable instructions may include an input module 410 to receive input data 405, and an analysis module 420.

In an example, the analysis module 420 analyzes real-time usage of the data center infrastructure. Example usage information may include resources being used in the data center and corresponding power consumption. The usage information may also include alternative configurations of the infrastructure, such as use allocations (e.g., virtual versus actual) and interoperability between components, which may be implemented to reduce power consumption at the data center.

The analysis may include dynamic trade-offs between the income derived from adding or removing workload (and associated computing and cooling infrastructure), along with the needs of the utility and/or price being paid to provide additional electricity onto the power grid.

The analysis may be at any level of granularity. For example; the analysis module 420 may analyze information for specific equipment. In another example, the analysis module 420 may analyze information classes of devices (e.g., the storage devices and all middleware for accessing the storage devices). The analysis module 420 may take into consideration factors such as availability, and in addition, specific characteristics of the resources such as, logical versus physical resources.

During operation, the analysis module 420 may map existing workload to infrastructure use in the data center, and manage workload, e.g., based on opportunities to sell power onto the utility grid and/or for responding to utility grid events such as brownouts and blackouts. Power savings can be managed via a control module 430 operatively associated with an energy micro-grid 440, the computing infrastructure 450, and/or the cooling infrastructure 460 for the data center.

In an example, reducing workload to achieve power savings may be achieved by adjusting the quality of service for some or all users. For example, quality of service may be modified for a "green class" of service. Customers may sign up for the "green class" of service based on financial incentives, for social reasons, and/or for publicity.

In another example, spot pricing may be increased to reduce workload in the data center to realize power savings. For example, the operator may issue a notice to service providers to reduce their use of the data center, or reschedule data and processing operations, or be charged a higher spot price for their utilization of the data center during peak usage. The customer may be offered a discount price for using the data center during off-peak times.

In yet another example, power savings at the data center may be achieved through incentive programs (e.g., offering discounts) to encourage workload reductions. For example, a customer may be offered a refund or rebate for offloading operations from the data center during peak usage, and/or higher QoS or higher service level than the customer is subscribed to if the customer agrees to use the data center at a later time (e.g., during off-peak demand).

QoS adjustments, spot pricing, and/or incentives may be manually selected by a customer and/or operator to reduce workload in the data center. QoS adjustments, spot pricing, and/or incentives may also be automatically implemented, e.g., if workload is not reduced. In another example, QoS adjustments, spot pricing, and/or incentives may be implemented using a combination of both automatic and manual selection techniques.

Before continuing, it should be noted that the examples described above are provided for purposes of illustration, and are not intended to be limiting. Other devices and/or device configurations may be utilized to carry out the operations described herein.

Figure 5A:
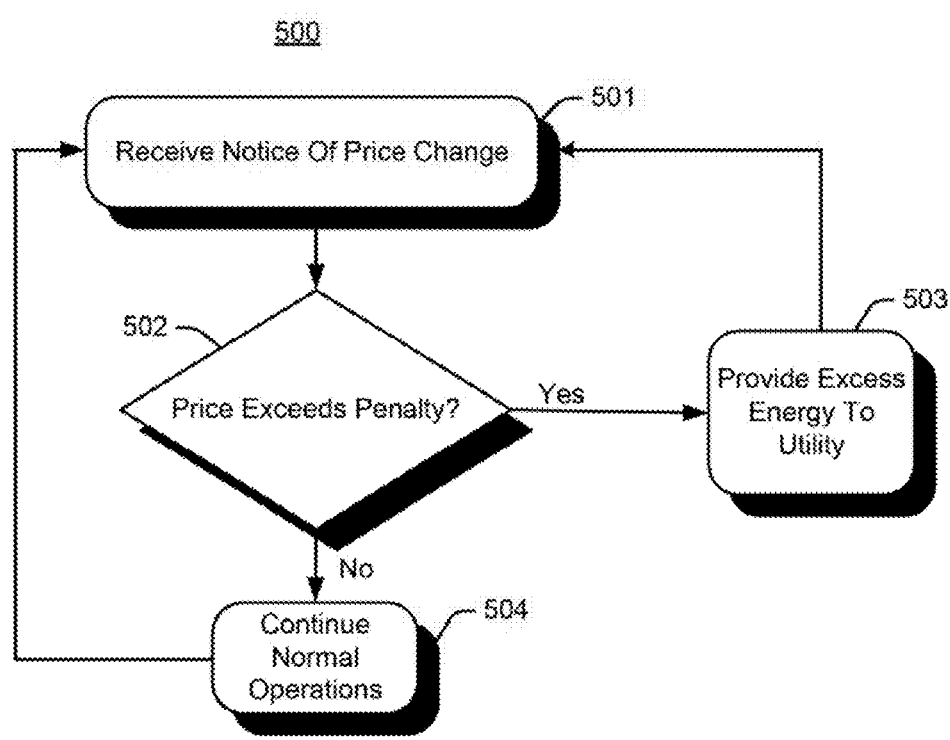
FIGS. 5*a-b* are flowcharts illustrating example operations for managing workload at a data center.
Figure 5B:
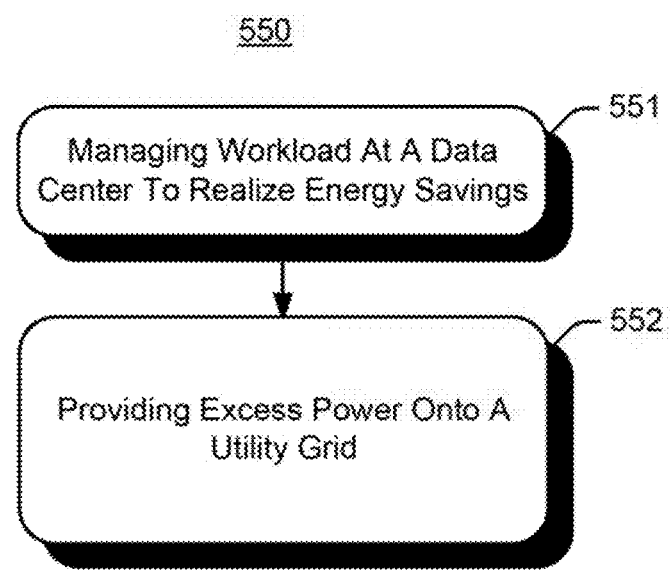

FIGS. 5a-b are flowcharts illustrating example operation for managing workload in a data center. Operations 500 and 550 may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

In FIG. 5a, operation 501 includes receiving notice from a utility of peak load and price for electricity. Operation 502 includes determining if the price warrants action. For example, if it is determined that the price is greater than the penalty for reconfiguring the data center (e.g., reducing QoS, shedding workload, modifying use of the cooling infrastructure). If yes, then operation 503 includes starting a process of shedding workload and/or modifying use of the cooling infrastructure at the data center (e.g., switching off chillers, and using ice storage to cool the data center). If no (e.g., the penalty is greater than the cost of collecting/storing biogas or electricity, or generating the electricity or other energy), then operation 504 includes continuing to operate without shedding any load.

It is noted that only one of these conditions must hold. Having more conditions hold just increases the amount of power that the data center operator has available to sell to the utility. If either the price the utility is offering changes, or any of the costs to the data center operator change, then these choices may be re-evaluated.

In FIG. 5b, operation 551 includes managing workload at a data center to realize energy savings. Operation 552 includes providing excess power generated for the data center onto a utility grid.

By way of illustration, operations may include reducing workload at the data center in response to an increase in price for providing the excess power onto the utility grid by, and/or in response to a power shortage on the utility grid (e.g., a brownout or blackout event) or to prevent a power shortage.

In an example, power savings may be realized by modifying quality of service to reduce the workload at the data center. It is noted that modifying the QoS doesn't have to mean that dropping the workload will happen. Instead, this could mean that various constraints are reduced or relaxed, for example, the level of infrastructure redundancy provided an application/service may be reduced, so that some of the infrastructure can be turned off and the electricity saved can be sold to the utility grid. Depending on how large the reduction is, the workload may not even be noticeably affected (e.g., if only redundant equipment is powered off and no failures occur).

In another example, quality of service may be reduced for a so-called "green class" of service. Consumers may sign up for the "green class" of service based on financial incentives, for social and/or publicity reasons. Power savings may also be realized by increasing spot pricing for services, thereby providing a financial incentive to reduce the workload at the data center.

The operations shown and described herein are provided to illustrate example implementations. It is noted that the operations are not limited to the ordering shown. Still other operations may also be implemented.

Further operations may include generating the excess power for the data center separate from the utility grid. For example, generating the excess power may be by using a plurality of waste digesters producing methane gas. A subset of the plurality of waste digesters may be configured to produce excess methane gas for providing onto the utility grid.

In another example, ice storage may be incorporated into the cooling operations at the data center. The ice storage is used for cooling the data center to reduce power consumption at the data center, and at least some excess power realized by using the ice storage, is transferred to the utility grid.

The operations may be implemented at least in part using an end-user interface (e.g., web-based interface). In an example, the end-user is able to make predetermined selections, and the operations described above are implemented on a back-end device to present results to a user. The user can then make further selections. It is also noted that various of the operations described herein may be automated or partially automated.

It is noted that the examples shown and described are provided for purposes of illustration and are not intended to be limiting. Still other examples are also contemplated.

The invention claimed is:

1. A method comprising:
actively managing workload at a data center to realize energy savings, wherein the actively managing includes increasing spot pricing for a computing service provided by the data center to reduce the workload at the data center, wherein the computing service includes running at least a portion of the workload on processing resources of the data center; and
providing excess power generated for the data center onto a utility grid when a current grid price is higher than estimated self-generated energy costs, wherein providing excess power comprises configuring a subset of a plurality of off-grid resources to produce excess biogas during off peak usage, wherein the subset of the plurality of off-grid resources comprise a subset of a plurality of digesters producing biogas for a micro-grid of the data center, and the subset of digesters have greater biogas storage capacity than other digesters on the micro-grid, and the subset of digesters have a faster rate of biogas production than the other digesters on the micro-grid.

2. The method of claim 1, further comprising responding to an increase in price being paid for providing the excess power onto the utility grid by reducing the workload at the data center.

3. The method of claim 1, further comprising responding to a power shortage on the utility grid by reducing the workload at the data center to provide the excess power generated for the data center onto the utility grid.

4. The method of claim 1, further comprising reducing quality of service of the computing service to reduce the workload at the data center.

5. The method of claim 1, further comprising modifying quality of service for a green class of service provided by the data center to reduce the workload at the data center.

6. The method of claim 1, further comprising generating the excess power for the data center on an energy micro-grid separate from the utility grid.

7. The method of claim 6, further comprising generating the excess power using renewable resources.

8. The method of claim 1, further comprising storing ice at the data center, wherein the stored ice is used for cooling the data center to reduce power consumption at the data center.

9. The method of claim 8, wherein at least some excess power realized by using the stored ice, is transferred to the utility grid.

10. A system including machine readable instructions stored in a non-transient computer-readable medium, the machine readable instructions comprising instructions executable to cause a processor to:

actively manage workload at a data center to realize energy savings, wherein to actively manage the workload the processor is to increase spot pricing for a computing service provided by the data center to reduce the workload at the data center, wherein the computing service includes running at least a portion of the workload on processing resources of the data center;

estimate self-generated energy costs of the data center; and provide excess power generated for the data center onto a utility grid when a current grid price is higher than the estimated self-generated energy costs, wherein the excess power is provided by a subset of a plurality of digesters producing biogas for a micro-grid of the data center, and the subset of digesters have greater biogas storage capacity than other digesters on the micro-grid, and the subset of digesters have a faster rate of biogas production than the other digesters on the micro-grid.

11. The system of claim 10, wherein the excess power is provided onto the utility grid in response to an increase in price being paid for the excess power.

12. The system of claim 10, wherein the excess power is provided onto the utility grid in response to a predicted brownout or blackout event on the utility grid to help prevent an actual brownout or blackout event.

13. The system of claim 10, wherein the machine readable instructions further comprise instructions executable to cause the processor to modify quality of service for a green class to reduce the workload at the data center.

14. The system of claim 10, wherein the machine readable instructions further comprise instructions executable to cause the processor to manage ice storage at the data center, the ice storage used for cooling the data center.

15. The system of claim 14, wherein the machine readable instructions further comprise instructions executable to cause the processor to transfer at least some excess power realized from energy savings at the data center using the ice storage, to the utility grid.

16. A system comprising:

at least one processor to:

actively manage workload at a data center to realize energy savings, wherein actively managing includes increasing spot pricing for a computing service provided by the data center to reduce the workload at the data center, wherein the computing service includes running at least a portion of the workload on processing resources of the data center;

estimate self-generated energy costs of the data center; and provide excess power generated for the data center onto a utility grid when a current grid price is higher than the estimated self-generated energy costs, wherein the excess power is provided by a subset of a plurality of digesters producing biogas for a micro-grid of the data center, and the subset of digesters have greater biogas storage capacity than other digesters on the micro-grid, and the subset of digesters have a faster rate of biogas production than the other digesters on the micro-grid.

17. The system of claim 16, wherein the excess power is provided onto the utility grid in response to an increase in price being paid for the excess power.

* * * * *